United States Patent
Barth et al.

(10) Patent No.: US 6,438,836 B1
(45) Date of Patent: Aug. 27, 2002

(54) METHOD FOR PRODUCING A CAM THAT CAN BE PLACED ON A HOLLOW SHAFT TO FORM A CAMSHAFT

(75) Inventors: Andreas Barth, Leinfelden; Henning Blöcker, Stelle; Klaus Brandes, Asendorf; Frank Rohwer, Osterrönfeld, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/762,682

(22) PCT Filed: Jul. 3, 1999

(86) PCT No.: PCT/EP99/04641

§ 371 (c)(1),
(2), (4) Date: May 16, 2001

(87) PCT Pub. No.: WO00/09769

PCT Pub. Date: Feb. 24, 2000

(30) Foreign Application Priority Data

Aug. 11, 1998 (DE) .......................... 198 36 247

(51) Int. Cl.[7] .............................................. B23P 15/00
(52) U.S. Cl. ...................................... 29/888.1; 74/567
(58) Field of Search ............................ 219/600, 601, 219/602, 632, 640, 643; 148/567, 570, 574; 29/888.01; 74/567

(56) References Cited

U.S. PATENT DOCUMENTS 4,604,510 A * 8/1986 Laughlin et al. ............ 148/575

(List continued on next page.)

FOREIGN PATENT DOCUMENTS

| DE | 3738809 A1 | 5/1989 |
|---|---|---|
| DE | 4121951 C1 | 12/1992 |
| DE | 4420092 A1 | 12/1995 |
| DE | 4420092 C2 | 3/1996 |
| DE | 19716554 C1 | 4/1998 |
| EP | 0265663 A1 | 9/1987 |

OTHER PUBLICATIONS

Patentschrift No. 4420, filed Aug. 11, 1878.
DE–Z Extract from VEB Verlag Technik Berlin, Härten et al., "Induktionserwärmung", 1965.
DE–Z Extract from Rohwohlt, Herausgegeben von Gerhard Mattée, "Fertigungstechnik und Arbeitsmaschinen", Jul. 1972.
International Search Report (PCT/SA/210), Sep. 30, 1999.

*Primary Examiner*—I Cuda Rosenbaum
(74) *Attorney, Agent, or Firm*—Crowell & Moring LLP

(57) ABSTRACT

A process is provided for the production of a cam to be joined to a hollow shaft to form a camshaft. In order to make the cam suitable for stable long-term operation on the camshaft, the internal compressive stresses achieved in the cam track before the joining of the cam to the camshaft being so high that the tensile stresses resulting from joining are permanently overcompensated, it is provided that the material selected for the cam is a steel in which the carbon can be dissolved easily as cementite in the pearlite and martensite or is in the form of a fine composite carbide. The cam, which is composed of a hardenable steel, should be fully hardened and, during tempering in the hardening operation, the basic hardness should be set in a range of between 25 and 40 HRC. The cam should then be edge-zone-hardened in a two-stage heating process by induction hardening at a medium frequency of 10–35 kHz, after the preheating stage of the heating process, the introduction of heat being interrupted for 0.3–1.5 seconds. After the action of the preheat, the cam track should then be heated in such a way by means of medium frequency that an edge-zone hardening depth of between at least 0.5 mm and at most 2.0 mm relative to the cam base circle and the cam flanks and at most 2.2 mm relative to the cam tip is obtained in the middle of the track, after which the cam is sprayed with a quenching medium immediately, within a matter of milliseconds of the end of the heating process.

7 Claims, 1 Drawing Sheet

U.S. PATENT DOCUMENTS

| | | | |
|---|---|---|---|
| 4,675,488 A | | 6/1987 | Mucha et al. ............ 219/10.43 |
| 4,714,809 A | * | 12/1987 | Hammond et al. ......... 219/632 |
| 4,749,834 A | | 6/1988 | Mucha et al. ............ 219/10.43 |
| 4,759,808 A | * | 7/1988 | Novorsky ................... 148/572 |
| 4,785,147 A | | 11/1988 | Mucha et al. ............ 219/10.59 |
| 4,855,551 A | | 8/1989 | Mucha et al. ............ 219/10.43 |
| 4,867,810 A | * | 9/1989 | Novorsky ................... 148/572 |
| 4,893,789 A | * | 1/1990 | Novorsky ................... 266/129 |
| 4,905,538 A | * | 3/1990 | Watanabe et al. ........... 148/903 |
| 5,122,204 A | * | 6/1992 | McDonald .................. 148/320 |
| 5,573,057 A | * | 11/1996 | McDonald .................. 164/127 |
| 5,737,975 A | * | 4/1998 | Hanisch et al. ............... 74/567 |
| 5,796,078 A | * | 8/1998 | Ottenwaelder et al. ..... 148/572 |
| 5,826,461 A | * | 10/1998 | Kaywood et al. .......... 123/90.6 |
| 6,006,429 A | * | 12/1999 | Hanisch et al. ............ 29/888.1 |

* cited by examiner

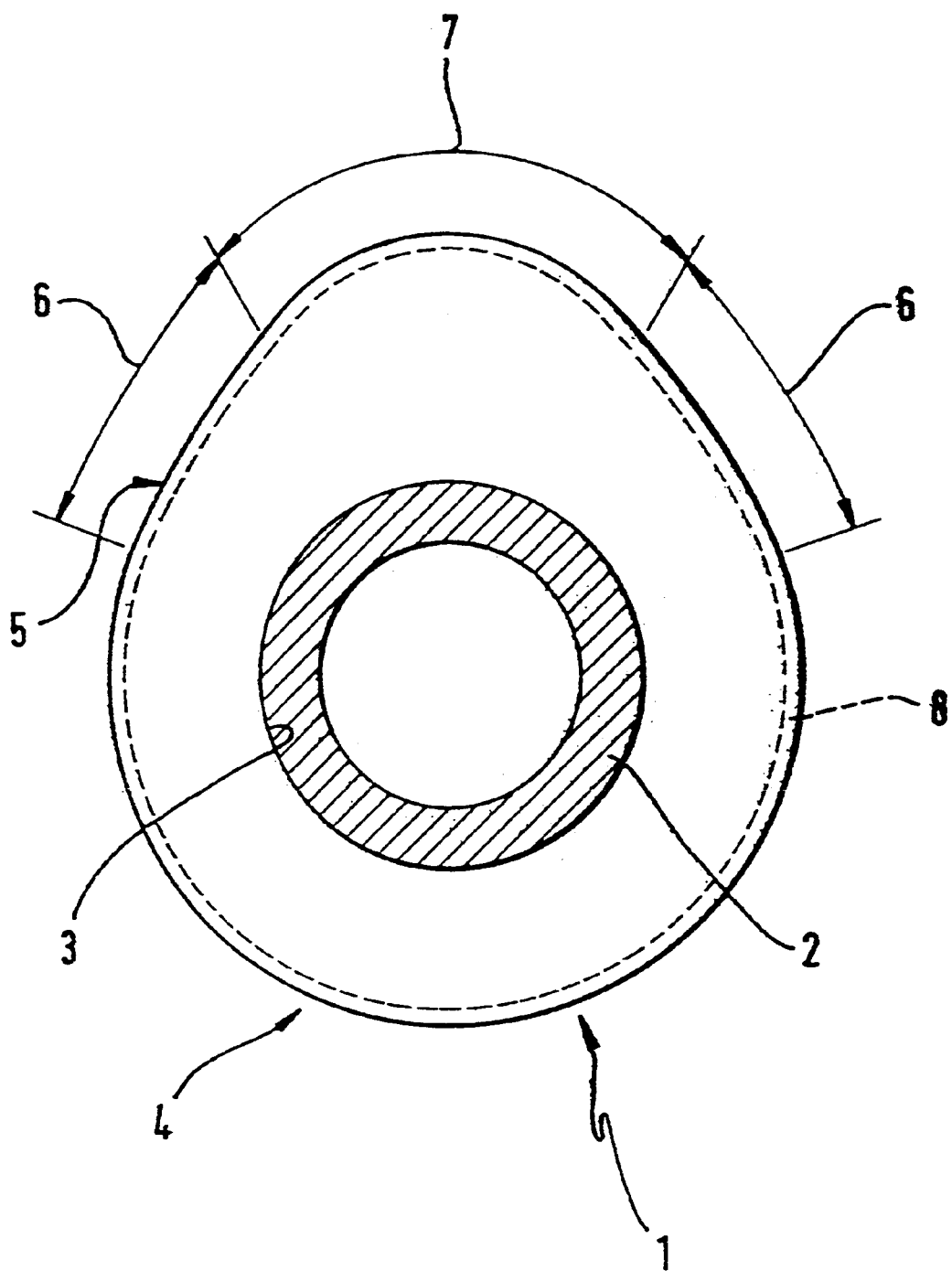

METHOD FOR PRODUCING A CAM THAT CAN BE PLACED ON A HOLLOW SHAFT TO FORM A CAMSHAFT

The invention relates to a process for the production of a cam to be joined to a hollow shaft to form a camshaft in accordance with the precharacterizing clause of Patent Claim 1.

Weight-optimized camshafts can be produced economically by joining cams to a tube in a form- and force-locking manner. As regards functional reliability, the cams must have both a high adhesion on the tube for operational reliability even when accepting high engine torques and have a hardened track, and, for reasons of wear resistance, the latter must have sufficient internal compressive stresses after the joining of the cams. This applies particularly to the cam flank and, to a limited extent, also to the cam tip in valve timing systems with roller cam followers. Where internal compressive stresses are absent or internal tensile stresses are present in the cam track, additional tensile stresses are caused during engine operation by rolling-contact operations, and these stresses can lead to overloading of the material in the track, giving rise to fatigue or disintegration of the latter.

A method of the generic type is known from DE 44 20 C2.

The object on which the invention is based is to develop a method of the generic type in such a way that the cam is suitable for stable long-term operation on the camshaft, the internal compressive stresses achieved in the cam track before the joining of the cam to the camshaft being so high that the tensile stresses resulting from joining are permanently overcompensated.

According to the invention, the object is achieved by the features of Patent Claim 1.

Thanks to the invention, reproducible production of a cam with optimum functional properties with regard to secure retention of the cam on the hollow shaft under operational load after joining and to adequate intrinsic robustness in relation to the mechanical loads acting on it during engine operation is achieved by the interaction of a number of criteria. The selection of a cam material with a very high yield strength of at least 450 N/mm$^2$ is absolutely decisive here for the achievement of the properties mentioned, these properties emerging from the heat treatment of the cam blank. Such cam materials include the hardenable steels 100 Cr 6, Ck 67, C 60, C 70 etc. To achieve the required minimum yield strength, these steels should be heat-treated before edge-zone hardening but can also be used in the hot-pressed condition (BY condition). The material stressed in accordance with the invention provides a high-strength structure which, owing to the large difference in yield strength relative to the tube, which is composed of the material St 37, St 52 or the like, for example, gives high cam adhesion during the subsequent joining of the fully-treated cam thanks to the elastic springback of the cam towards the tube, which is expanded plastically due to internal high pressure. In the case of heat treatment, it is necessary, in addition to making a suitable selection of steel material, to temper the steel in such a way that a basic hardness in a range of between 25 and 40 HRC is obtained since, below 25 HRC, unwanted plastic expansion of the cam during joining would occur and, above 40 HRC, stress cracks would occur in the cam track during subsequent edge-zone hardening or joining. The cam is then gently edge-zone-hardened by induction hardening in a two-stage heating process using an annular or shaped inductor at a medium frequency in a range of 10–35 kHz. Gentle edge-zone hardening means that the cam is preheated in the first stage of the heating process for up to 1.5 seconds at a power of about 40 kW, after which the introduction of heat is interrupted for 0.3–1.5 seconds. This pause avoids overheating effects in the structure, especially in the region of the track, and excessively high edge-zone hardening depths, which would normally occur after a second heating stage that immediately followed preheating, and a very gentle continuous drop in hardness from the edge zone to the core, which is close to the cam bore and is not edge-zone-hardened, is achieved. Such a drop in hardness is essential since otherwise the edge zone would be susceptible to cracking. The hardness in the region of the track is 60 HRC, for example, and decreases to 30 HRC in the region of the core. Moreover, the formation of a coarse martensite structure with soft residual austenite that occurs if further heating follows directly, i.e. if there is a second heating stage that continues directly after preheating, is avoided, leading to low internal compressive stresses in the structure.

Following the action of the preheat, the cam track is heated once more by means of medium frequency at increased power relative to that for preheating (second heating stage), giving a temperature above the austenitization temperature. The core structure is not affected by this process. Owing to the second heating stage in conjunction with the advantageous effects described of the preceding pause between the two heating stages of the heating process, it is now possible to establish an edge-zone hardening depth in the middle of the cam track of between at least 0.5 mm and at most 2.0 mm relative to the cam base circle and the cam flanks and at most 2.2 mm relative to the cam tip. It should be stated here that the figure of 0.5 mm in the middle of the track relates to a cam on which there is no need for a grinding allowance. Once the edge-zone hardening depth has been established and the heating process is complete, the cam is then immediately sprayed with an aqueous quenching medium (within a matter of milliseconds), as a result of which the austenitic structure of the cam is transformed completely into martensite. Very high internal compressive stresses arise in the structure during this transformation. The formation of other types of structure that produce only low internal compressive stresses is avoided owing to the rapid quenching to a temperature below the temperature for the formation of martensite. Moreover, the formation of a relatively thin edge zone during quenching prevents the outer regions of the edge zone from being transformed with a time offset relative to the regions closer to the core owing to the edge zone being too thick. If individual edge zone regions were to be transformed with such a time offset, the core zone, which is transformed latest, would produce tensile stresses in the cam track instead of internal compressive stresses. Almost simultaneous transformation of the cam structure in all regions of the edge zone is thus achieved according to the invention by the setting of a small edge-zone hardening depth and the immediate quenching of the cam, which can moreover be accomplished by means of oil or by means of a cold medium, such as liquid nitrogen. The complete transformation into a martensitic structure that takes place during this process generates very high internal compressive stresses in the cam owing to the expansion in the volume of the thin edge zone due to transformation, and these stresses overcompensate by far the tensile stresses that result from subsequent joining. In addition, internal compressive stresses at the surface of the track are produced by shrinkage processes in the cam during spraying.

Expedient developments of the invention can be taken from the subclaims; the invention is moreover explained in greater detail below with reference to an exemplary embodiment illustrated in the drawings; in these, the FIGURE shows in a cross section a cam produced in accordance with the invention joined to a hollow shaft.

The FIGURE illustrates a cam 1, which is joined to a hollow shaft 2. The cam 1, which is composed of the material 100 Cr 6 V HI or C 70 BY HI etc., is produced by hot pressing owing to the speed and economy of this process. However, it can also be formed from a solid piece of material by mechanical cutting, in particular by milling. A cam can furthermore also be produced by casting. After hot pressing, the cam 1 is cooled in a controlled manner from the forming heat to give a BY condition or is heat-treated after hot pressing. Overlaps of material on the hot-pressed cam 1 can be removed mechanically if required in order to avoid hardening cracks during subsequent full hardening. After the full hardening and edge-zone-hardening process according to the invention, the basic 2-stage heating process of which is performed by means of a shaped inductor or annular inductor, it being necessary during this process to shield the tip of the cam in a suitable manner from overheating, the cam 1 is thermally stress-relieved by induction or in a continuous furnace at a temperature below 190° C. This can also be accomplished in a two-stage inductive process at a frequency in a range of from 20 to 40 kHz and a power of about 5 kW. The time required for the first and second stage is 1–3 seconds, the two stages being separated by a pause of 2–6 seconds.

This prevents cracks during the subsequent joining of the cam 1 and the final grinding of the cam track 5. During thermal stress relief, internal compressive stresses in the martensite structure are partially removed without transforming the structure itself, as a result of which a tougher martensite structure is achieved. This also ensures crack resistance during subsequent joining. However, a proportion of the internal compressive stresses is likewise removed during stress relief; during the stress relief process, care should therefore be taken, through optimized management of the control parameters (e.g. tempering at below 190° C. etc.), that, on the one hand, the internal compressive stresses obtained through edge-zone hardening are not reduced too far and, on the other hand, that the hardness in the edge zone 8 is not reduced too far either, if possible not below 58 HRC.

After stress relief of the edge-zone-hardened cam 1, this is joined in such a way that high joining stresses act in the base circle 4. Joining techniques may vary but the use of internal high-pressure forming is to be preferred in order to obtain an operationally reliable joint. This is because this process involves expanding the hollow shaft 2 plastically without causing the development of heat, the cam 1 being deformed elastically and springing back onto the hollow shaft 2 after the relief of the high fluid pressure and forming an extremely durable twist-proof fit on it.

As mentioned above, the cam track 5 is edge-zone-hardened in such a way that the maximum possible internal compressive stresses are built up. To achieve this, the edge-zone hardening depth must be at most 2.0 mm in the base circle 4 and in the cam flank 6 and at most 2.2 mm at the cam tip 7, more specifically in the middle of the track. To ensure that the edge zone does not penetrate the cam 1 as the roller on the roller cam follower rolls over it, a residual edge-zone hardening depth of at least 0.5 mm is required after the finish-grinding of the track 5. With the edge-zone hardening depth thus selected, high internal compressive stresses remain in the base circle 4, even where the joining stresses are up to 250 N/mm². The joining stresses in the cam track 5 are determined by radiography. In the cam tip 7, which is not affected by the joining process, and in the cam flank 6, where there are hardly any joining stresses, the internal compressive stresses after joining are at least 200 N/mm². In the case of concave cam flanks 6, internal compressive stresses of as much as 300 N/mm² can be achieved after joining. The characteristic values given here apply to cams 1 that are stress-relieved at 180° C. after edge-zone hardening and where the grinding allowance of the cam track 5 is up to 0.7 mm. In the case of lower tempering temperatures or smaller grinding allowances, higher internal compressive stresses and thus higher permissible joining stresses can generally be achieved in the base circle 4. With the edge-zone hardening depth subject to its upper limit, it is possible to edge-zone-harden cams with a web height of just 4.0 mm in a manner that is optimized in terms of internal compressive stresses.

In addition to the possibility of achieving high cam adhesion on the hollow shaft 2 by virtue of maximum permissible joining stresses resulting from the achievement by the invention of high internal compressive stresses in the cam 1, the cam bore 3 can be blasted with special fused alumina, for example, before the joining operation, significantly increasing the adhesion of the cam 1 on the hollow shaft 2. If the joining parameters and cam geometries are kept the same, the adhesion achieved is twice as great after such blasting. Using the maximum possible joining stress of 250 N/mm² and the expansion pressure during the internal high-pressure process, at which the internal compressive stresses in the base circle 4 of the cam 1 are not compensated, static torques of up to 400 Nm can be accepted by the cam in an operationally reliable manner when blasting is employed.

Finish-grinding of the cam track 5 can be carried out with cubical boron nitride if appropriate. Given adequate cooling, it is even possible to increase the internal compressive stresses in areas of the cam track 5 that are close to the surface to as much as about 600 N/mm² through appropriate control or setting of the grinding parameters, such as the type and supply of coolant and the grinding depth, improving the tribological characteristics of the cam track 5. This is advantageous particularly in the case of cams with a small web height.

What is claimed is:

1. Process for the production of a cam to be joined to a hollow shaft to form a camshaft, the cam, which is composed of a hardenable steel, being edge-zone-hardened in a two-stage heating process by induction hardening at a medium frequency of 10–35 kHz to an edge-zone hardening depth of at least 0.5 mm in a middle of a track, and then being quenched, the material selected for the cam being a steel in which the carbon can be dissolved easily as cementite in a pearlite and martensite or is in the form of a fine composite carbide, wherein after the preheating stage of the heating process, the introduction of heat is interrupted for 0.3–1.5 seconds, and wherein after the action of the preheat, the cam track is then heated in such a way by means of medium frequency that an edge-zone hardening depth of between at least 0.5 mm and at most 2.0 mm relative to the cam base circle and the cam flanks and at most 2.2 mm relative to the cam tip is obtained in the middle of the track, after which the cam is sprayed with a quenching medium immediately within a matter of milliseconds of the end of the heating process.

2. Process according to claim 1, wherein the cam is produced by hot pressing.

3. Process according to claim 2, wherein overlaps of material on the hot-pressed cam are removed mechanically before full hardening.

4. Process according to claim 1, wherein, after edge-zone hardening, the cam is thermally stress-relieved in a furnace at below 190° C. or thermally stress-relieved at briefly higher temperatures by induction.

5. Method according to claim 1, wherein the cam is heat-treated before edge-zone hardening and, during the tempering that follows the heat treatment, a basic hardness of the cam in a range of between 25 and 40 HRC, is established.

6. Method according to claim 1, wherein the cam is edge-zone-hardened from the BY condition directly after hot pressing.

7. A cam produced according to the process of claim 1.

* * * * *